(12) United States Patent
Mueller (10) Patent No.: US 10,592,829 B2
(45) Date of Patent: Mar. 17, 2020

(54) INTEGRATING ACTION REQUESTS FROM A PLURALITY OF SPOKE SYSTEMS AT A HUB SYSTEM

(75) Inventor: Douglas Mueller, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 234 days.

(21) Appl. No.: 13/006,127

(22) Filed: Jan. 13, 2011

(65) Prior Publication Data

US 2012/0185290 A1 Jul. 19, 2012

(51) Int. Cl.
*G06Q 10/06* (2012.01)

(52) U.S. Cl.
CPC ............... *G06Q 10/06311* (2013.01); *G06Q 10/063114* (2013.01)

(58) Field of Classification Search
CPC .................................................. H04L 41/5074
USPC ................................................ 705/7.11–7.42
See application file for complete search history.

(56) References Cited

U.S. PATENT DOCUMENTS

| | | | | |
|---|---|---|---|---|
| 5,953,389 A * | 9/1999 | Pruett et al. | | 379/9 |
| 7,356,640 B2 * | 4/2008 | Suishu et al. | | 711/100 |
| 7,647,391 B1 * | 1/2010 | Jean et al. | | 709/223 |
| 2004/0111634 A1 * | 6/2004 | Ingman et al. | | 713/201 |
| 2006/0178898 A1 * | 8/2006 | Habibi | | G06Q 10/10 705/1.1 |
| 2006/0233313 A1 * | 10/2006 | Adams et al. | | 379/21 |
| 2008/0168531 A1 * | 7/2008 | Gavin | | 726/1 |
| 2008/0195614 A1 * | 8/2008 | Lutz et al. | | 707/7 |
| 2008/0270910 A1 * | 10/2008 | Lukasik et al. | | 715/740 |
| 2009/0144115 A1 * | 6/2009 | Drew et al. | | 705/8 |
| 2009/0161858 A1 * | 6/2009 | Goss et al. | | 379/265.09 |
| 2011/0246378 A1 * | 10/2011 | Prussack et al. | | 705/310 |

\* cited by examiner

*Primary Examiner* — Richard N Scheunemann
(74) *Attorney, Agent, or Firm* — Brake Hughes Bellermann LLP (57) ABSTRACT

Disclosed are methods and systems to automatically integrate work requests from multiple Spoke systems at a centralized Hub system. In one embodiment, a Hub system receives a portion of a work request from a problem tracking system executing in the region (e.g., geographic area or network subnet) of an associated Spoke system. The request comprises enough information for the Hub system to prioritize this work request against other work requests already received from this same Spoke system, other Spoke systems in the same region, or even other Spoke systems from other regions. A Hub user can then be presented with an integrated work queue of requests to service after they have been properly prioritized. The Hub user may be supporting multiple clients in an outsourcing style Information Technology (IT) support model or a call center model. Supported clients can execute on different data center platforms, at the same time.

23 Claims, 4 Drawing Sheets

INTEGRATING ACTION REQUESTS FROM A PLURALITY OF SPOKE SYSTEMS AT A HUB SYSTEM

BACKGROUND

This disclosure pertains to a method and system for providing a centralized interface to an integrated work queue of tasks (e.g., action items) where each task could have originated on a different and potentially remote system. More particularly, but not by way of limitation, this disclosure relates to a Hub (centralized system) and Spoke (remote system) integration of service tasks wherein each service task may further be automatically enabled for processing (i.e., performance of the task) in the context and environment of the originating Spoke system.

Today's enterprise computing environments comprise a plurality of techniques to support end users. Additionally, programmable control devices located at a personal residence often require technical support. Implementations of "trouble ticket" or customer support capabilities can be tailored for a particular vendor or environment. Typical trouble shooting support employees are confined to a particular set of support capabilities or environments they can support.

As the need for customer support has increasingly been "outsourced" to service providers, prior art techniques of providing support to disparate technologies and environments have caused an unneeded segmentation of support staff. Additionally, outsourcing implementations commonly cross countries and different countries have substantially different rules about transmission and storage of data. In particular, different countries have substantially different data privacy laws, so copying complete data records (or even persistent storage of data) to provide an efficient support mechanism may not conform to the different governmental laws and regulations. Additionally, corporate policy may dictate that certain information may not be copied and stored at an "outsourcing" location. Because of these concerns, complete replication of data or federation of trouble support databases may not be a viable solution.

Additionally, prior art techniques are typically limited to a single environment or potentially a small number of support environments because support engineers are confined by the capabilities of their support infrastructure. Solutions to these and other problems are described below to allow a support engineer's support infrastructure to dynamically adapt, based on the infrastructure and technology in use at the supported environment, as opposed to being limited by the supporting environment.

DETAILED DESCRIPTION

The present disclosure is described in the context of a service desk to provide centralized support for a variety of end users and systems. A service desk can provide many different types of capabilities including Change Management, Release Management, Service Request Management, Customer Service call center capabilities and Task Management to name a few. Each of these can be thought of in the general sense of a service desk because they are all processes that can involve the submission of a set of information that needs to be assigned to groups/individuals where the assigning and assigned people may have to work across entries arriving from multiple distinct sources. Any technical support work model that requires cross location and cross group management may benefit from the concepts of this disclosure.

To aid in the understanding of this disclosure the following definitions are provided:

Hub-user: a user of the logical Central Hub System providing support wherein that support may be initiated based on prioritized tasks in a work queue (e.g., problem tickets entered into a problem tracking system).

Spoke-user: a user on a remote Spoke system environment providing support to the Spoke environment directly (i.e., locally) when remote support may not be desired. For example, physical access to change a disk drive may be required or a very high priority task may require immediate local intervention.

Remote-user: an end user desiring device support; including users of a corporate infrastructure or customers of a service provider. Typically, a Remote-user will be neither a Spoke-user nor a Hub-user and will receive the desired support from either the Spoke-user or the Hub-user. However, a Remote-user may interact with the Spoke in various capacities. For example, the Remote-user may submit tickets (e.g., request support), check status or update information.

Spoke-region (region): a logical collection of programmable control devices conforming to at least a portion of a standard set of support applications and governmental laws/regulations.

Hub (or Central Hub System): a logical collection point for task requests originating from a plurality of connected Spoke-regions.

A general overview is now provided using the above terminology and then more detailed embodiments are described. In general, a Hub-user connects to the Hub allowing the Hub-user a single system to provide a complete list of the work the Hub-user is responsible for. The Hub-user is provided correctly ranked and prioritized information regardless of the origin of the service request. The Hub could have logic that adjusts and rebalances priorities of assignments as appropriate. Priorities may be determined based on severity of problem, service level agreements, contracted support obligations (e.g., gold level, silver level, bronze level), and other methods known to those of ordinary skill in the art.

In one embodiment, the Hub-user and the support staff do not perform actual work from the Hub. They connect to the Hub to access their work queue and when they access a particular task to perform work on the task the Hub-user can be automatically redirected to a "work session" (e.g., a work connection such as a hosted window or a telnet connection) with the appropriate Spoke or system associated with the Spoke-region. In this manner, the Hub-user can connect to the Hub and when they begin work on a task they can be: automatically connected to, open the details, and perform the work on the appropriate Spoke that owns the requested task. When the task is complete, the Hub-user can close that session and retrieve the next highest priority assigned task (as assigned at the Hub) to begin work on the appropriate item. Also, a Hub-user may not be limited to working one particular task at a time and may be working several concurrent tasks and thus have several "work sessions" to one or more Spokes at any given time.

Security may be accounted for in a number of ways. Upon initiation of the session with the Spoke a password prompt could be provided. Alternatively, single sign-on credentials could be incorporated into the Hub and Spoke architecture to only allow certain Hub-users direct connection capabilities to the Spoke-regions they support.

Because of the logical architecture of the Hub and Spoke system, there is no requirement that all spokes host the same version of an application or even the same applications. Spoke-regions could have different logic and work differently from each other. In this case the Hub-user performing the task may get a different "look and feel" of the application they are supporting but can be spared the need to know (or remember) how to initiate different support applications in different Spoke-regions. Because each task is worked in the context of the Spoke-region, data and conformance policies of systems in the particular Spoke-region are still in effect.

Overall, the approach described herein allows the retention of local instances of an application with local differences while also providing consolidated global access to the work in progress within the system for the workers and the management personnel responsible for the disparate systems. The local systems at a Spoke-region are not required to change in order to participate in the disclosed environment so virtually any application can be accommodated in this shared environment. For example, this may allow for more seamless transition of support tasks when a corporate acquisition takes place.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the information technology support system field having the benefit of this disclosure.

Figure 1:
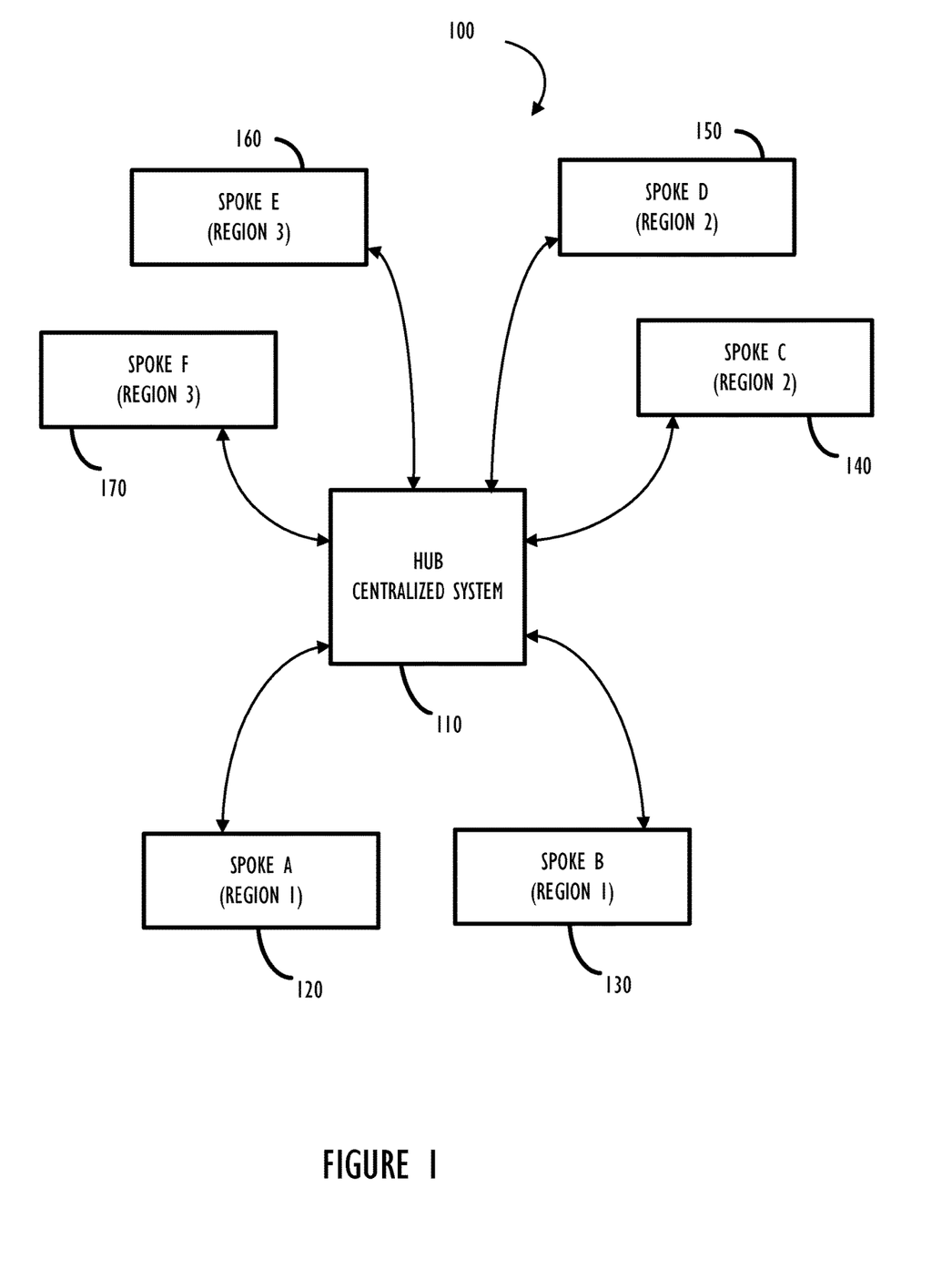
FIG. 1 illustrates, in block diagram form, an example of a Hub and Spoke architecture configured to provide remote support to local systems or customers according to one disclosed embodiment.

Referring now to FIG. 1, a block diagram 100 illustrates a Hub and Spoke architecture according to one embodiment. Central Hub System 110 reflects a collection point for support requests. In this example, support request could originate in three different Spoke-regions (1-3). Spoke systems A (120) and B (130) are in Spoke-region 1; Spoke systems C (140) and D (150) are in Spoke-region 2; and Spoke systems E (160) and F (170) are in Spoke-region 3. Note, for simplicity this example shows each of Spoke systems A-F are bi-directionally linked to Central Hub System 110. However, many different forms of communication capabilities could be used in different Spoke-regions and a Spoke-region (or system in a Spoke-region) may not be directly connected bi-directionally with Central Hub System 110. Additionally, even though two systems are shown in each region, a region could contain any number of Spoke systems or computers associated with Spoke systems.

Also, Central Hub System 110 is shown here as a single system for simplicity. However, Central Hub System 110 can be a logical collection of one or more support systems located in one or more data centers communicatively coupled to each other. Furthermore, in the case where Central Hub System 110 includes a collection of one or more support systems, the Spoke systems may be exclusively related to a single support system of the Hub or, alternatively, related to more than one of the support systems of the Hub at a time. As shown, support requests collected at Central Hub System 110 can originate from a plurality of remote regions. Remote regions reflect one or more sets of Remote-users that may typically be in a different physical location from a support staff member (i.e., a Hub-user). To properly administer support to a remote region there should be at least one communication coupling between the remote region and the Hub-user. This connection may be direct or indirect. The communication coupling could be network communication capability to propagate data (e.g., trouble ticket information) between the remote region and Central Hub System 110 or it could comprise a Remote-user communicating (e.g., via phone or email) to a "help desk" or "call center" for entry of a trouble ticket. In either case, a problem ticket may be opened for a problem in the environment of the end-user.

After entry, the trouble ticket information, or a portion thereof, may be propagated to a Hub-user for support action. Upon receipt at Central Hub System 110, the new trouble ticket information can be integrated or prioritized relative to a plurality of other requests for service or support. Additionally, upon receipt or thereafter the new trouble ticket may be assigned, either automatically or manually, to an appropriate Hub-user or Spoke-user for attention. Again, note that a software application managing trouble ticket information for a Spoke-region may be different from the software application providing the same function at Central Hub System 110 or other Spoke-regions.

Figure 2:
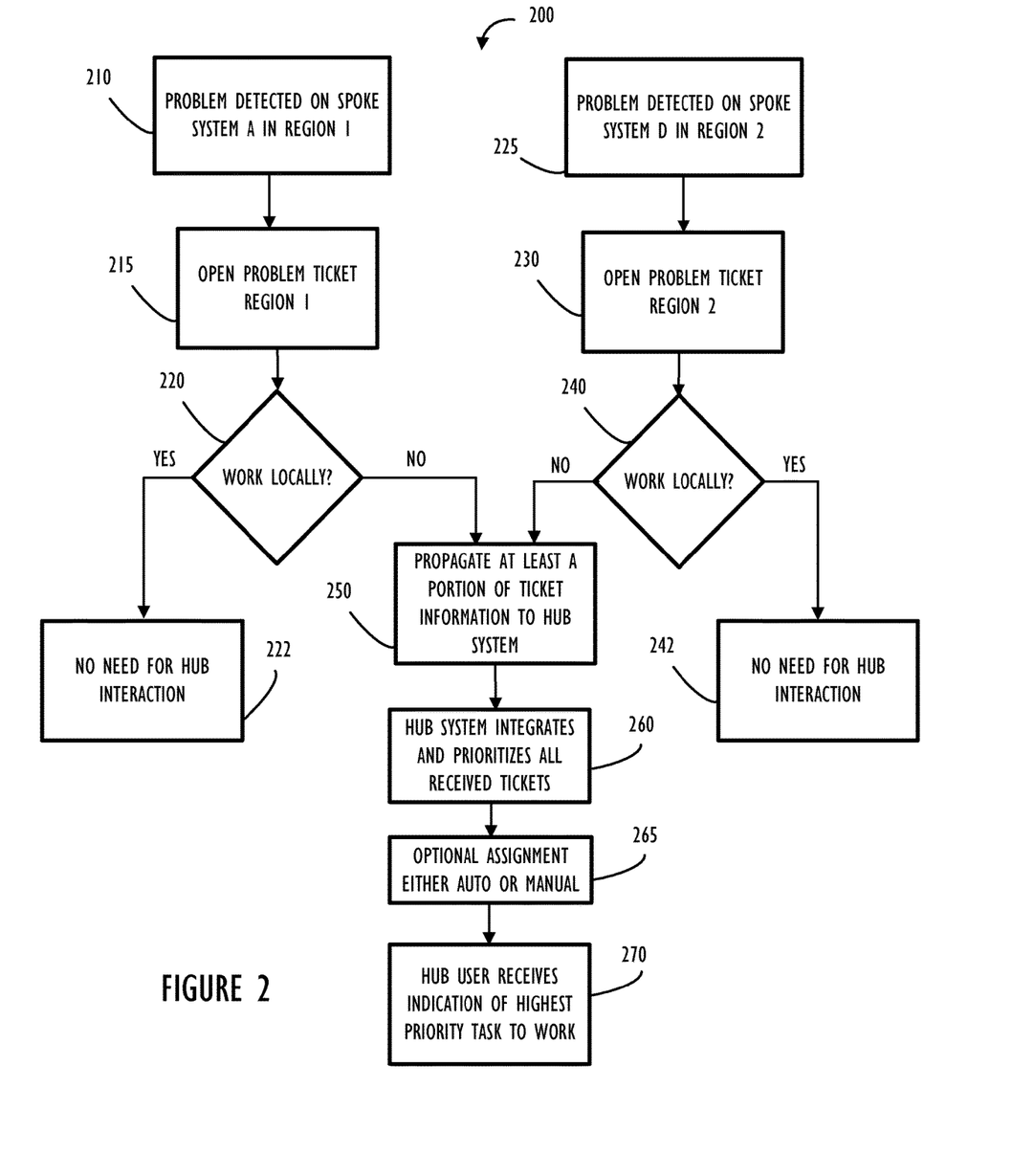
FIG. 2 illustrates a flow chart depicting problem ticket generation at a Spoke system and transmission of a required subset of information to a Hub system user for action to address the problem ticket.

Referring now to FIG. 2, flow chart 200 depicts a possible work flow for problem support request processing according to one embodiment. Beginning at block 210, a problem is detected on a computing device of Spoke A in region 1 (See FIG. 1). To obtain appropriate support, a problem ticket can be generated as shown in block 215 in the problem tracking system associated with devices of region 1. At block 220, it can be determined, either manually or automatically, whether the problem ticket should be addressed locally at region 1 or through support provided by augmented support staff (e.g., outsourced support staff). If it is determined to service the problem ticket locally (the YES prong of block 220), flow can continue to block 222 with no need for Hub-user or Hub System interaction. However, if it is determined to include the Hub support staff (the NO prong of block 220), at least a portion of the problem ticket information may be propagated to Central Hub System 110 as shown in block 250. The propagated portion can represent less than all information (e.g., a subset or "sub-ticket") available at Spoke A region 1 120 because propagation of some information may be prohibited from being sent to Central Hub System 110. Upon receipt at the Central Hub System 110, the new sub-ticket (i.e. subset of problem ticket information) can be integrated and prioritized with respect to other new and already existing support tickets (block 260). After receipt, either an automatic assignment or manual assignment (block 265) may be performed. A Hub-user can then monitor a work list of assigned, integrated and prioritized problem ticket tasks and address the current highest priority ticket assigned to them (block 270). Blocks 225, 230, 240 and 242 reflect problem ticket origination similar to that described for blocks 210-222 for a different Spoke system (D) and a different user in a different Spoke region (i.e., region 2). Note that the problem ticket administration environment, such as a problem tracking software application in use in region 1, may or may not be the same type of software application in use for region 2. This can be accomplished at least in part because only a subset of problem ticket information need be propagated to Central Hub System 110.

Figure 3:
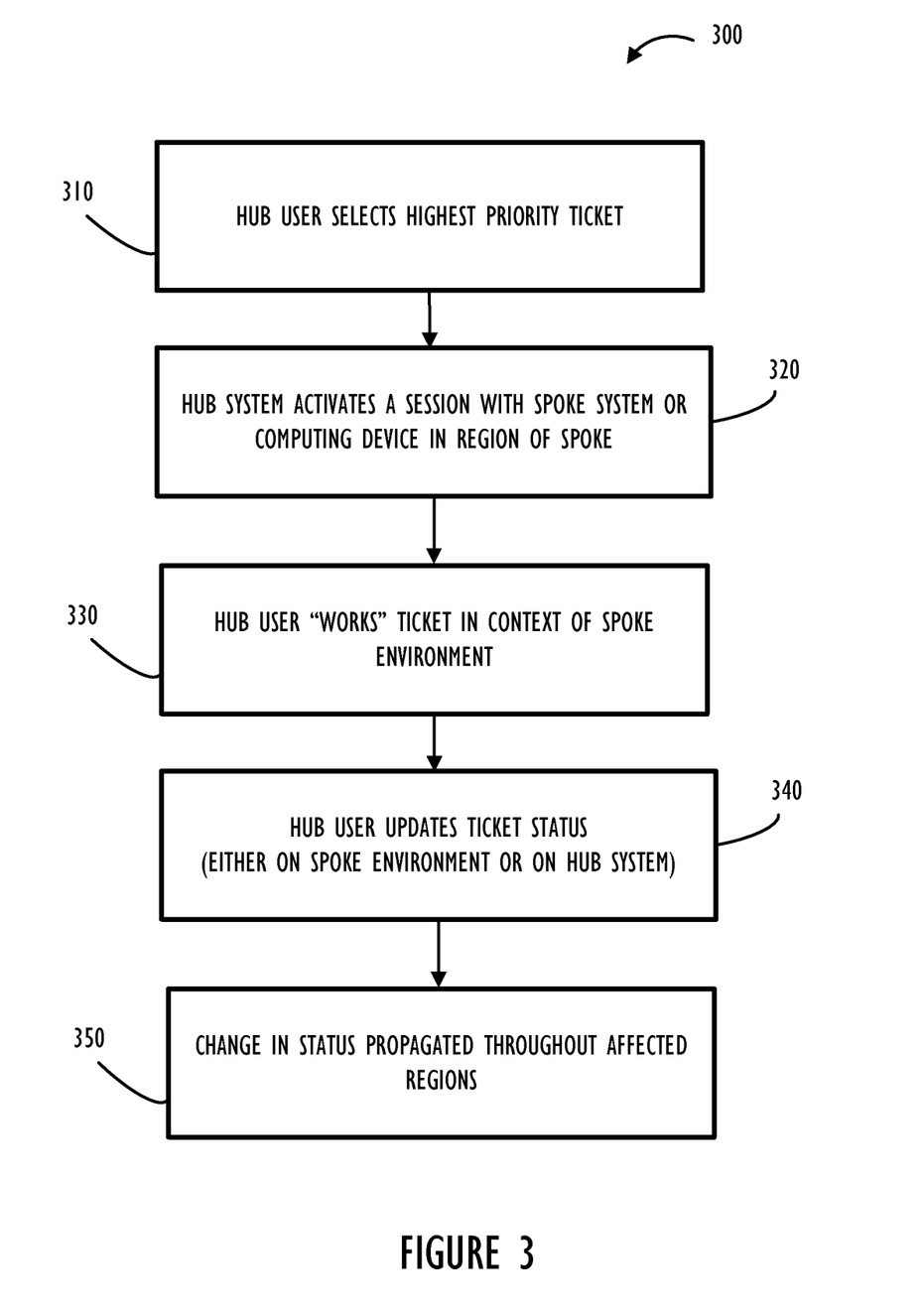
FIG. 3 illustrates, in flowchart form, an embodiment of addressing a problem ticket in the context of a Hub user.

Referring now to FIG. 3, flow chart 300 illustrates a possible work flow for a Hub-user working on Central Hub System 110. Beginning at block 310 a Hub-user will typically select the next highest priority ticket from the integrated list of work tasks in his/her queue. Note that not all Hub-users will necessarily see the same integrated list of work tasks. Each Hub-user may have different security permissions and may also support different types of technology used by end-users. For example, Hub-users may be trained to work on different types of computer systems (e.g., mainframe, desktop computers, workstation computer systems, server type computers, computers running different types of operating systems, computers running different types of applications, etc.). If a Hub-user is not trained or does not have security to work on a particular trouble ticket, that work task will preferably not be displayed to that particular Hub-user. After a Hub-user selects a task to work on, the information which had previously been propagated to Central Hub System 110 and possibly other information can be collected to activate a session (block 320) with the Spoke system (or a computing device associated with the region of the Spoke system). The session may be activated in the context of the Spoke system's region so that the Hub-user is now "working" the ticket in the environment associated with the origination of the problem ticket (block 330). As noted above, different regions may run different types of computer applications and different types of environments. By using a session in the context of the Spoke system's region the Hub-user can more effectively address issues particular to the trouble ticket. In this manner, the environment of the Hub-user on Central Hub System 110 is not as apt to interfere with the Hub-user's ability to work the ticket. For example, the Central Hub System 110 does not have to have any particular versions of software which may vary (and possibly conflict) from region to region. Flow may then continue to block 340 where a status of the ticket associated with a work task may be updated. The status may be updated directly in the problem tracking software of the Spoke system region and propagated back to the Hub-system (if appropriate) or can be updated at the Hub-system and propagated back to the Spoke system region (block 350). In either case, a status update may be done in a single location by the Hub-user and if the problem was addressed the trouble ticket can be closed at a single location without forcing a Hub-user to update a status in two systems. Similarly, if notes are to be added to a non-solved ticket the ticket can be updated in a single location and likely reassigned to either a Spoke-user or another Hub-user for additional support.

Figure 4:
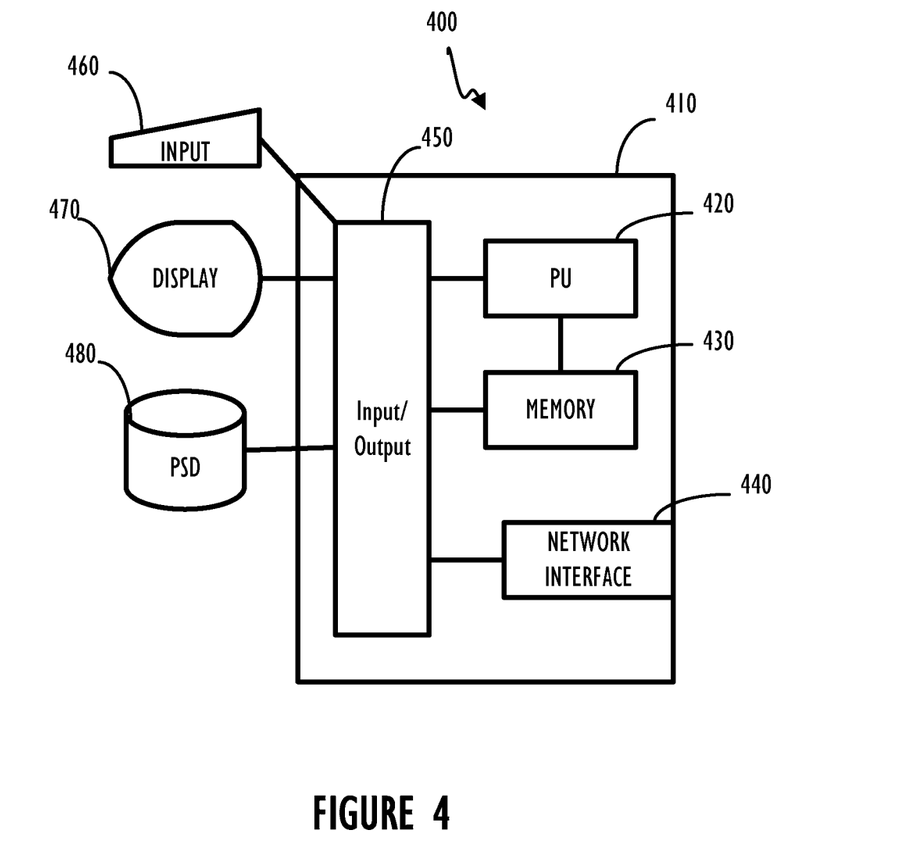
FIG. 4 illustrates, in block diagram form, an example computing device comprising a program control device.

Referring now to FIG. 4, example computing device 400 is shown. One or more example computing devices 400 may be included in a mainframe or distributed computer (neither shown). Example computing device 400 comprises a programmable control device 410 which may be optionally connected to input devices 460 (e.g., keyboard, mouse, touch screen, etc.), display 470 and/or program storage device (PSD) 480 (sometimes referred to as a direct access storage device DASD). Also, included with program control device 410 is network interface 440 for communication via a network with other computing and corporate infrastructure devices (not shown). Note network interface 440 may be included within programmable control device 410 or be external to programmable control device 410. In either case, programmable control device 410 will be communicatively coupled to network interface 440. Also note, program storage unit 480 represents any form of non-volatile storage including, but not limited to, all forms of optical and magnetic storage elements including solid-state storage.

Program control device 410 may be included in a computing device and be programmed to perform methods in accordance with this disclosure. Program control device 410 may itself comprise processor unit (PU) 420, input-output (I/O) interface 450 and memory 430. Processing unit 420 may include any programmable control device including, for example, processors of an IBM mainframe (such as a quad-core z10 mainframe microprocessor). Alternatively, in non-mainframe systems examples of processing unit 420 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 430 may include one or more memory modules and comprise random access memory (RAM), read only memory (ROM), programmable read only memory (PROM), programmable read-write memory, and solid state memory. One of ordinary skill in the art will also recognize that PU 420 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 2 and 3 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 2 and 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of operating a central computer system to provide support for one or more infrastructure technology (IT) environments, the method comprising:
    integrating, at a central computing system, a plurality of sub-tickets from a plurality of disparate remote systems, including:
        receiving, at the central computing system, a first sub-ticket from a first remote system, the first sub-ticket comprising a portion, less than all, of attributes associated with a first trouble ticket at the first remote system,
        receiving, at the central computing system, a second sub-ticket from a second remote system, wherein the second remote system is different from the first remote system, the second sub-ticket comprising a portion, less than all, of attributes associated with a second trouble ticket at the second remote system,
        integrating, by the central computer system, information from the first sub-ticket and the second sub-ticket to form a consolidated information set in a single queue;
    providing the consolidated information set to a plurality of users of the central computer system for selection of at least one of the first and second sub-tickets by one of the plurality of users of the central computer;
    receiving an indication of a selection of the first sub-ticket or the second sub-ticket by one of the plurality of users;
    in response to receiving the indication of the selection of the first sub-ticket from one of the plurality of users on the central computing system, opening a window from the first remote system on a display of the central computing system and activating a session between the central computing system and the first remote system, wherein the window is in a context of the first remote system, and rendering all details of the first trouble ticket in the window to enable the user to perform work directly on the first remote system from the central computing system using the window and the activated session between the central computing system and the first remote system as requested in the first trouble ticket; and
    in response to receiving the indication of the selection of the second sub-ticket from one of the plurality of users on the central computing system, opening a window from the second remote system on the display of the central computing system and activating a session between the central computing system and the second remote system, wherein the window is in a context of the second remote system, and rendering all details of the second trouble ticket in the window to enable the user to perform work directly on the second remote system from the central computing system using the window and the activated session between the central computing system and the second remote system as requested in the second trouble ticket.

2. The method of claim 1, further comprising:
    assigning one of the plurality of sub-tickets to one of the plurality of users of the central computer system.

3. The method of claim 1, further comprising:
    prioritizing an order of the first sub-ticket and the second sub-ticket in the single queue.

4. The method of claim 1, wherein the window originates from the remote end of the session and is hosted at a near end of the session.

5. The method of claim 1, wherein the window represents a terminal connection to the remote end of the session.

6. The method of claim 1, wherein the central computer system is in a different geographical region from the first remote system or the second remote system.

7. The method of claim 6, wherein the central computer system is in a different geographical region from both the first remote system and the second remote system.

8. The method of claim 1, wherein transmission of complete information associated with the first trouble ticket to the central computer system is prohibited.

9. The method of claim 1, wherein storage of information required to address the first trouble ticket at the central computer system is prohibited.

10. The method of claim 1, wherein the central computer system comprises a plurality of computers communicatively coupled to each other.

11. The method of claim 1, wherein the first remote system comprises a single system.

12. The method of claim 1, wherein the first remote system comprises a plurality of computers communicatively coupled to each other.

13. The method of claim 1, further comprising:
    updating a status corresponding to the first and second trouble tickets associated with the selected first and second sub-tickets via the first and second sessions; and
    propagating at least a portion of the updated status information to the central computer system.

14. The method of claim 1, further comprising:
    updating a status corresponding to the first and second trouble tickets associated with the selected first and second sub-tickets at the central computer system; and
    propagating at least a portion of the updated status information back to the originating regions corresponding to the first and second trouble tickets.

15. A non-transitory computer readable medium comprising computer readable instructions stored thereon to cause a processing device of a central computer system to:

integrate a plurality of sub-tickets from a plurality of disparate remote systems, including instructions to:
    receive a first sub-ticket from a first remote system, the first sub-ticket comprising a portion, less than all, of attributes associated with a first trouble ticket at the first remote system,
    receive a second sub-ticket from a second remote system, wherein the second remote system is different from the first remote system, the second sub-ticket comprising a portion, less than all, of attributes associated with a second trouble ticket at the second remote system,
    integrate information from the first sub-ticket and the second sub-ticket to form a consolidated information set in a single queue;
provide the consolidated information set to a plurality of users of the central computer system for selection of at least one of the first and second sub-tickets by one of the plurality of users of the central computer system;
receive an indication of a selection of the first sub-ticket or the second sub-ticket by one of the plurality of users;
in response to receiving the indication of the selection of the first sub-ticket from one of the plurality of users on the central computing system, open a window from the first remote system on a display of the central computing system and activate a session between the central computing system and the first remote system, wherein the window is in a context of the first remote system, and render all details of the first trouble ticket in the window to enable the user to perform work directly on the first remote system from the central computing system using the window and the activated session between the central computing system and the first remote system as requested in the first trouble ticket; and
in response to receiving the indication of the selection of the second sub-ticket from one of the plurality of users on the central computing system, open a window from the second remote system on the display of the central computing system and activate a session between the central computing system and the second remote system, wherein the window is in a context of the second remote system, and render all details of the second trouble ticket in the window to enable the user to perform work directly on the second remote system from the central computing system using the window and the activated session between the central computing system and the second remote system as requested in the second trouble ticket.

16. The non-transitory computer readable medium of claim 15 further comprising computer readable instructions stored thereon to cause the processing device of the central computer system to:
    prioritize an order of the first sub-ticket and the second sub-ticket in the single queue.

17. The non-transitory computer readable medium of claim 15, wherein the central computer system is in a different geographical region from the first remote system or the second remote system.

18. A computer network comprising:
a plurality of processing units communicatively coupled to the computer network and collectively configured to:
    integrate, at a central computing system, a plurality of sub-tickets from a plurality of disparate remote systems, including instructions to:
        receive a first sub-ticket from a first remote system, the first sub-ticket comprising a portion, less than all, of attributes associated with a first trouble ticket at the first remote system,
        receive a second sub-ticket from a second remote system, wherein the second remote system is different from the first remote system, the second sub-ticket comprising a portion, less than all, of attributes associated with a second trouble ticket at the second remote system,
        integrate information from the first sub-ticket and the second sub-ticket to form a consolidated information set in a single queue;
    provide the consolidated information set to a plurality of users of the central computer system for selection of at least one of the first and second sub-tickets by one of the plurality of users;
    receive an indication of a selection of the first sub-ticket or the second sub-ticket by one of the plurality of users;
    in response to receiving the indication of the selection of the first sub-ticket from one of the plurality of users on the central computing system, open a window from the first remote system on a display of the central computing system and activate a session between the central computing system and the first remote system, wherein the window is in a context of the first remote system, and render all details of the first trouble ticket in the window to enable the user to perform work directly on the first remote system from the central computing system using the window and the activated session between the central computing system and the first remote system as requested in the first trouble ticket; and
    in response to receiving the indication of the selection of the second sub-ticket from one of the plurality of users on the central computing system, open a window from the second remote system on the display of the central computing system and activate a session between the central computing system and the second remote system, wherein the window is in a context of the second remote system, and render all details of the second trouble ticket in the window to enable the user to perform work directly on the second remote system from the central computing system using the window and the activated session between the central computing system and the second remote system as requested in the second trouble ticket.

19. A computer system comprising one or more programmable control devices communicatively coupled to each other and to a computer network, wherein the one or more programmable control devices are programmed to:
    integrate, at a central computing system, a plurality of sub-tickets from a plurality of remote systems, including instructions to:
    receive a first sub-ticket from a first remote system, the first sub-ticket comprising a portion, less than all, of attributes associated with a first trouble ticket at the first remote system,
    receive a second sub-ticket from a second remote system, wherein the second remote system is different from the first remote system, the second sub-ticket comprising a portion, less than all, of attributes associated with a second trouble ticket at the second remote system,
    integrate information from the first sub-ticket and the second sub-ticket to form a consolidated information set in a single queue;

provide the consolidated information set to a plurality of users of the central computer system for selection of at least one of the first and second sub-tickets by one of the plurality of users of the central computer system;

receive an indication of a selection of the first sub-ticket or the second sub-ticket;

in response to receiving the indication of the selection of the first sub-ticket from one of the plurality of users on the central computing system, open a window from the first remote system on a display of the central computing system and activate a session between the central computing system and the first remote system, wherein the window is in a context of the first remote system, and render all details of the first trouble ticket in the window to enable the user to perform work directly on the first remote system from the central computing system using the window and the activated session between the central computing system and the first remote system as requested in the first trouble ticket; and in response to receiving the indication of the selection of the second sub-ticket from one of the plurality of users on the central computing system, open a window from the second remote system on the display of the central computing system and activate a session between the central computing system and the second remote system, wherein the window is in a context of the second remote system, and render all details of the second trouble ticket in the window to enable the user to perform work directly on the second remote system from the central computing system using the window and the activated session between the central computing system and the second remote system as requested in the second trouble ticket.

20. The method of claim 1, wherein providing the consolidated information set comprises providing a portion of the consolidated information set to a user of the plurality of users of the central computer system based on permissions associated with the user.

21. The non-transitory computer readable medium of claim 15, wherein the computer readable instructions stored thereon to cause the processing device of the central computer system to provide the consolidated information set comprise instructions stored thereon to cause the processing device of the central computer system to provide a portion of the consolidated information set to a user of the plurality of users of the central computer system based on permissions associated with the user.

22. The computer network of claim 18, wherein providing the consolidated information set comprises providing a portion of the consolidated information set to a user of the plurality of users of the central computer system based on permissions associated with the user.

23. The computer system of claim 19, wherein providing the consolidated information set comprises providing a portion of the consolidated information set to a user of the plurality of users of the central computer system based on permissions associated with the user.

* * * * *